No. 757,796. PATENTED APR. 19, 1904.
C. WEAR.
WHEEL WEEDER.
APPLICATION FILED JULY 27, 1903.
NO MODEL. 2 SHEETS—SHEET 1.
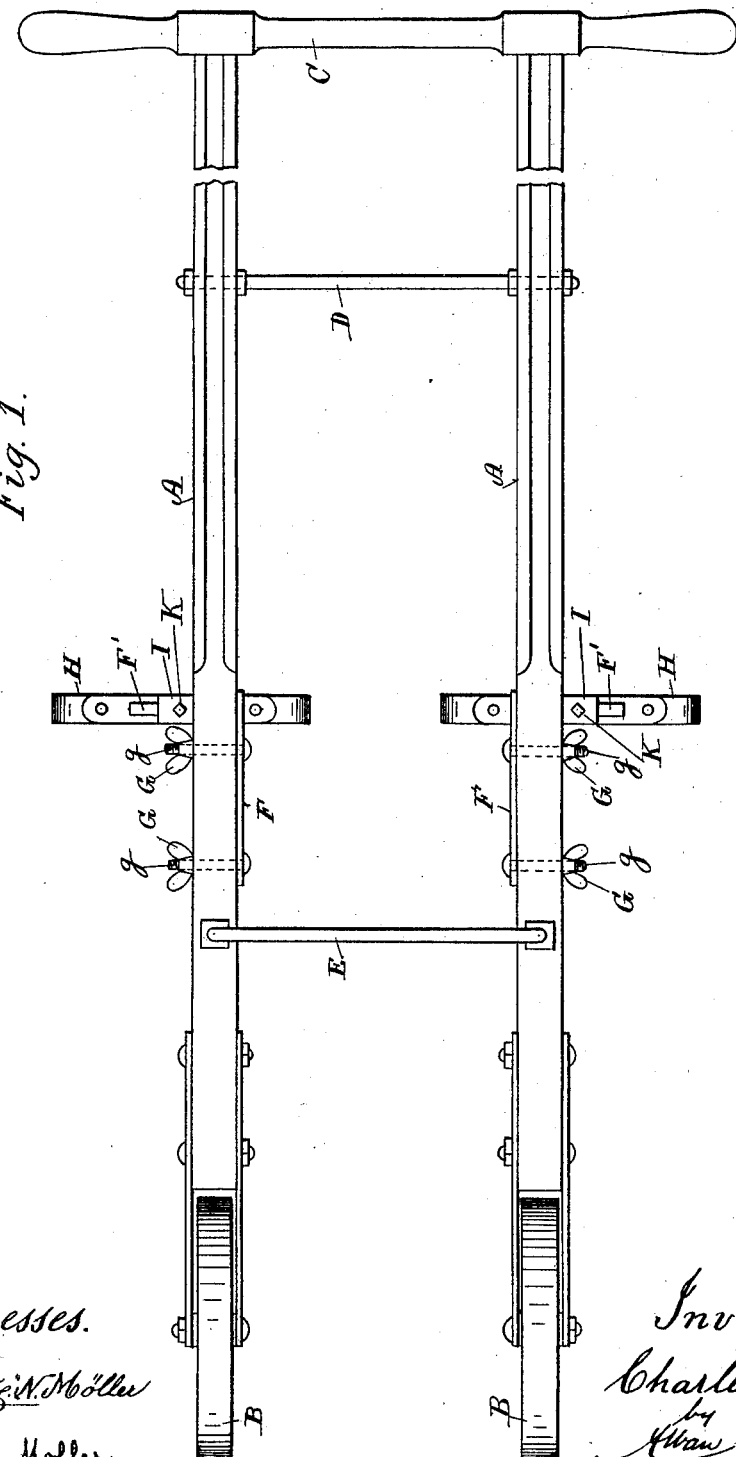
Witnesses.
Lauritz N. Möller
Mary C. Möller
Inventor.
Charles Wear.
by Allan Andrew
his atty No. 757,796. PATENTED APR. 19, 1904.
C. WEAR.
WHEEL WEEDER.
APPLICATION FILED JULY 27, 1903.
NO MODEL. 2 SHEETS—SHEET 2.
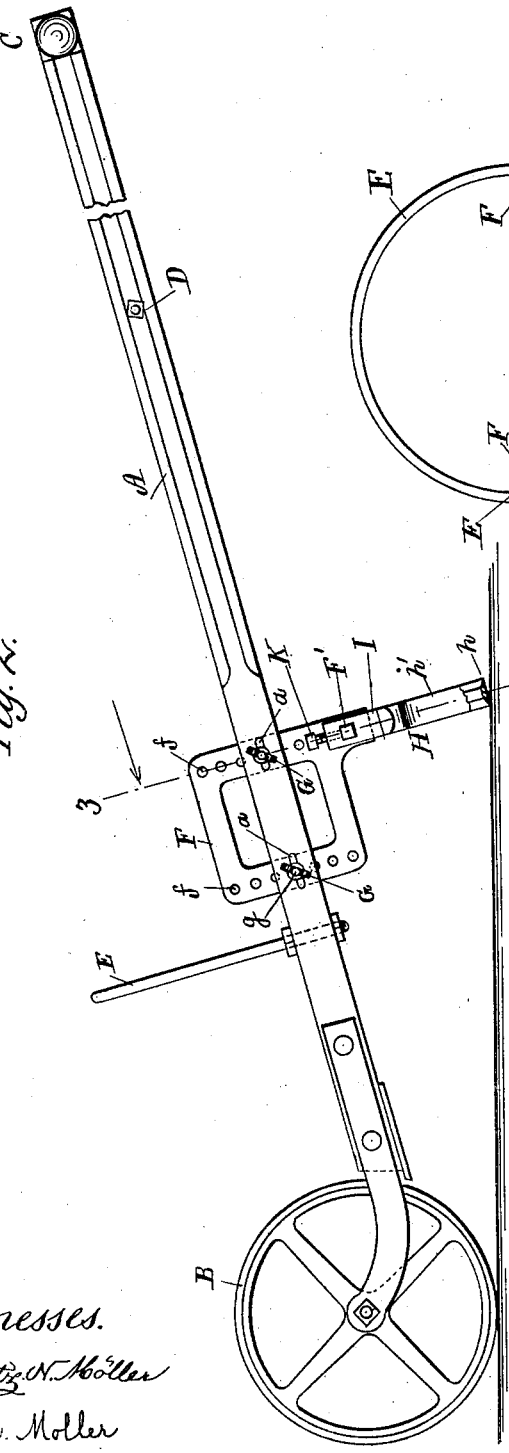
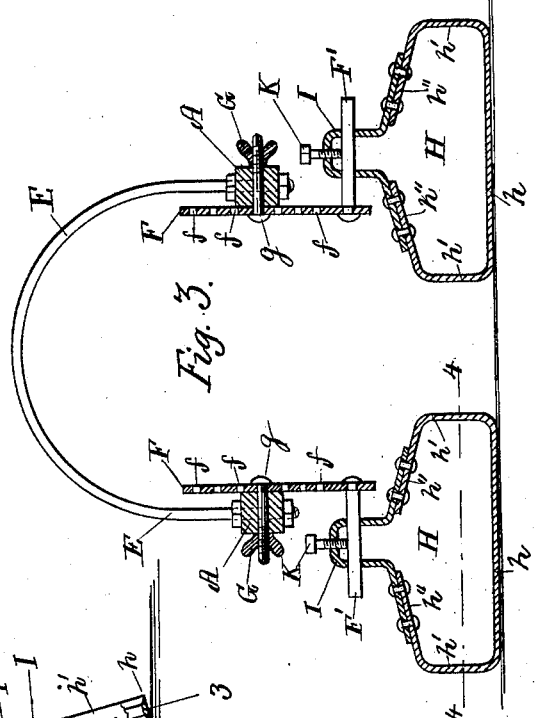
Witnesses.
Lauritz N. Möller
Mary C. Möller
Inventor.
Charles Wear.
by Alban Andrew his atty No. 757,796. Patented April 19, 1904.

UNITED STATES PATENT OFFICE.

CHARLES WEAR, OF DANVERS, MASSACHUSETTS, ASSIGNOR TO CHARLES S. EMMERTON, OF PEABODY, MASSACHUSETTS.

WHEEL-WEEDER.

SPECIFICATION forming part of Letters Patent No. 757,796, dated April 19, 1904.

Application filed July 27, 1903. Serial No. 167,089. (No model.)

*To all whom it may concern:*

Be it known that I, CHARLES WEAR, a citizen of Canada, and a resident of Danvers, in the county of Essex and State of Massachusetts, have invented certain new and useful Improvements in Wheel-Weeders, of which the following is a specification.

This invention relates to improvements in wheel-weeders for weeding vegetables usually planted in rows, and it is constructed as follows, reference being had to the accompanying drawings, wherein—

Figure 1 is a top plan view of the invention. Fig. 2 is a side elevation of the same. Fig. 3 is a cross-section on the line 3 3 shown in Fig. 2, and Fig. 4 is an enlarged cross-section on the line 4 4 shown in Fig. 3.

Similar letters refer to similar parts wherever they occur on the different parts of the drawings.

In the drawings, A A are a pair of parallel rigid and non-adjustable frame-bars to the forward ends of which are pivotally connected the wheels B B. The rear ends of said frame-bars are secured together by means of a handle-bar C, as shown.

D is a stay or brace for securing the frame-bars A A at a proper distance apart, such brace being preferably arranged about midway between the ends of said bars A A. Back of the wheels B B the bars A A are secured at a proper distance apart by means of an arched metal brace E, which permits the device to be pushed forward on opposite sides of the row of plants during the weeding operation without injuring or breaking the tops of the plants.

Preferably to the inside of each bar A is adjustably secured a vertically and angularly adjustable metal plate F, provided with two parallel rows of perforations $f$ $f$, through which and, preferably, slotted perforations $a$ $a$ in the frames A A are inserted headed screw-bolts $g$ $g$, provided with thumb-nuts or nuts G G, by means of which the plates F F are secured to the frames A A after being adjusted in proper positions thereon. To the lower end of each plate F is secured or made integral therewith a laterally-projecting weeder-supporting pin or bar F', on which the weeders are secured and capable of adjustment to and from each other, according to the size of the plants that are to be weeded.

H H are the two skeleton weeder-blades, each composed of a bent metal strip having a horizontal portion $h$ continuous with upright end portions $h'$ $h'$ and upper inwardly-bent terminals $h''$ $h''$, as shown in Fig. 3. To the upper end of each skeleton weeder-blade is attached a socket I, having a horizontal perforation adapted to receive the supporting-pin F', upon which said socket and its weeder-blade are laterally adjustable and secured after being adjusted thereon by means of a binder-screw K, as shown. It will thus be seen that the two weeder-blades are capable of a lateral adjustment to and from each other relative to the row of plants that are to be weeded.

The forward and rear edges of the horizontal and vertical portions $h$ and $h'$ $h'$ are sharpened and provided with cutting edges, as shown in Figs. 2 and 4, by which arrangement the position of the skeleton weeder-blades may be reversed in case one edge should become worn or blunted, so as to utilize the opposite edge, thus increasing the utility of the weeder-blades without too frequent resharpening.

By making the weeder-blades adjustable up and down relative to the frame A A the inclination of the latter may be varied to enable it to be held in a proper position relative to the size of the operator using the weeder.

By having the weeder-carrying plates F F provided with perforations $f$ $f$ and the frame-bars A A provided with slotted perforations $a$ $a$ adapted to receive adjustable screw-bolts $g$ $g$ and nuts G G, I provide means for adjusting the position of the weeder-blades at any desired angle relative to the soil, as may be desirable during the weeding operation.

Having thus fully described the nature, construction, and operation of my invention, I wish to secure by Letters Patent and claim—

1. A wheel-weeder, consisting in combination, a rigid wheel-frame, a pair of slotted supporting-plates vertically adjustable on said frame, lateral pins carried by said plates and arranged below said frame and a pair of skeleton weeder-blades laterally adjustable on said pins, substantially as and for the purpose set forth.

2. A wheel-weeder, consisting in combination, a duplex rigid non-adjustable wheel-frame, supporting-plates vertically and pivotally adjustable on said frame, means for securing said plates in position, a pair of reversible weeder-blades laterally adjustable relative to each other, and means for securing said weeder-blades in their adjusted positions, substantially as and for the purpose set forth.

3. A wheel-weeder, consisting in combination, a duplex wheel-frame, consisting of two members secured together, each member having secured to it an adjustable weeder-support extending above and below the same, a lateral projection on the lower end of each of said supports, and a reversible skeleton weeder-plate having a socket adapted to be adjustably secured on said lateral projection, substantially as and for the purpose set forth.

4. A wheel-weeder, consisting in combination a duplex non-adjustable wheel-frame, a pair of weeder-blades adjustably secured vertically and laterally relative to said frame, and an arched brace secured to said frame intermediate at the rear of the wheels, substantially as and for the purpose set forth.

5. A wheel-weeder comprising a duplex non-adjustable wheel-frame, supporting-plates vertically and angularly adjustable on said frame, means for securing said plates in position, a pair of weeder-blades, means carried by the lower end of said plates for supporting the said blades, means for adjustably securing the said blades to said supporting means, and an arched brace secured to said frame between the forward end thereof and the said plates.

In testimony whereof I have affixed my signature in presence of two witnesses.

CHARLES WEAR.

Witnesses:
ALBAN ANDRÉN,
THEKLA ANDRÉN.